Jan. 10, 1950 W. E. BRADLEY 2,493,801

SIGNAL MIXING SYSTEM

Filed March 14, 1946 3 Sheets-Sheet 1

INVENTOR.
WILLIAM E. BRADLEY
BY Reynolds D. Brown
AGENT

INVENTOR.
WILLIAM E. BRADLEY
BY [signature]
AGENT

Jan. 10, 1950 W. E. BRADLEY 2,493,801

SIGNAL MIXING SYSTEM

Filed March 14, 1946 3 Sheets-Sheet 3

INVENTOR.
WILLIAM E. BRADLEY
BY
AGENT

Patented Jan. 10, 1950

2,493,801

UNITED STATES PATENT OFFICE 2,493,801

SIGNAL MIXING SYSTEM

William E. Bradley, Swarthmore, Pa., assignor, by mesne assignments, to Philco Corporation, Philadelphia, Pa., a corporation of Pennsylvania Application March 14, 1946, Serial No. 654,316

7 Claims. (Cl. 332—7)

This invention relates to signal mixing systems and more specifically to such systems employing vacuum tubes utilizing the principles of velocity modulation of a stream of electrically charged particles or electrons.

The principal object of the invention is to provide a highly efficient signal mixing system employing a vacuum tube of the velocity modulation type, in which two wave signals, one of which may be in the super-high frequency range, may be combined to yield substantial power output at a frequency equal to either the sum or the difference of the frequencies of the original signals, to the substantial exclusion of output at other frequencies.

Another object of the invention is to provide a heterodyne modulating system, utilizing a signal mixing system of the sort described above, wherein one of the signals to be mixed may be of relatively low frequency and already amplitude-, frequency- or phase-modulated, such modulation having been performed in any well known manner, and is combined with a super-high frequency signal to yield a carrier signal at a frequency equal to the sum or the difference of the two original frequencies and having the modulation of the lower of them. A modulating system operating on these principles is particularly desirable in the instance of frequency modulation because of the linearity of modulation achievable.

A further object of the invention is to provide a modulating system which is particularly suited for use in a high frequency radio relay system wherein a plurality of receiving and retransmitting stations are utilized to provide a link extending over a greater distance than can be covered through a single transmission in the frequency range available for the purpose. A typical example of this sort to which the invention is applicable is that of a radio relay link for the transmission of ordinary or color television signals. A number of stations would be required to achieve the desired range of transmission and each would be required to have good linearity and frequency response in order that the over-all transmission characteristics of the system might be satisfied.

Other objects and advantages of the invention will become apparent from a consideration of the following description and drawings in which.

Figure 3:
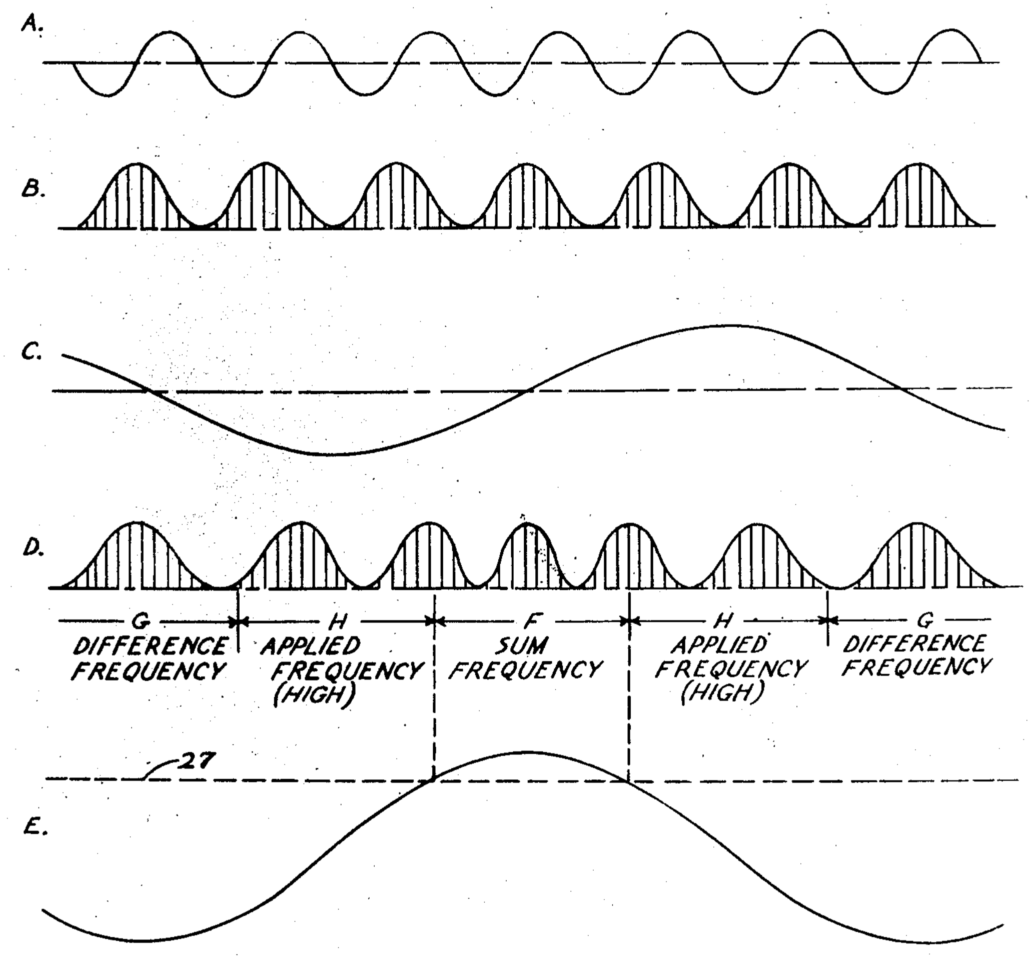

Figure 3 comprises explanatory curves which will be referred to in explaining the principles and operation of the invention.

Figure 1:
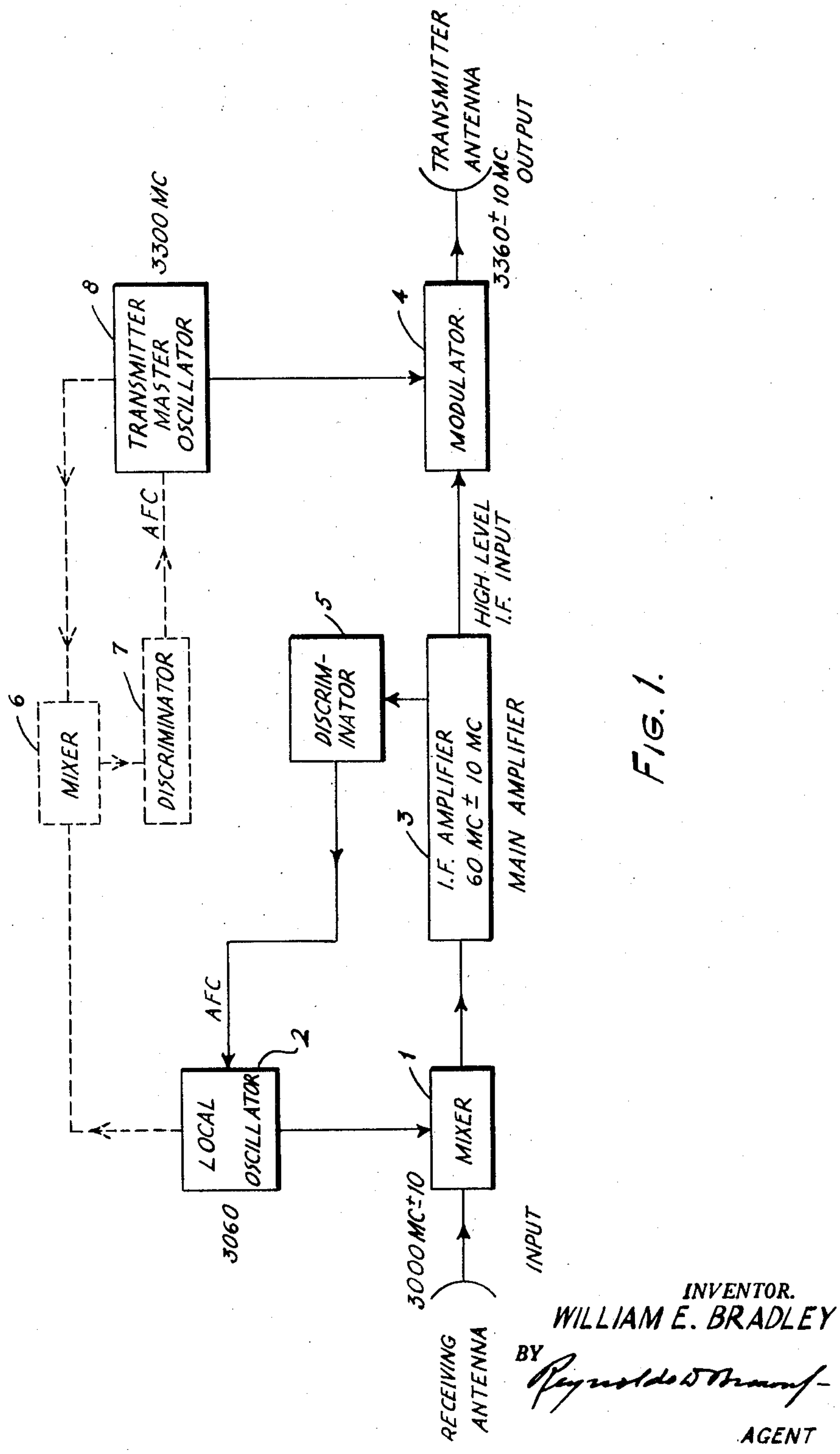
Figure 1 is a generalized block diagram of a relay station of the sort referred to above and to which the invention is applicable.

Referring now to Figure 1, in a typical relay station of the sort above referred to, amplitude-, frequency- or phase-modulated carrier wave signals at a predetermined carrier frequency (here assumed to be 3,000 megacycles) are intercepted by a suitable receiving antenna and are supplied to a mixer 1, together with local oscillator signals from a suitable source 2. The output from the mixer, which may be at an intermediate carrier frequency of 60 megacycles, is amplified in intermediate frequency amplifier 3 and supplied to modulator 4 for retransmission on a different carrier frequency, which, in this instance, may be 3360 megacycles. Also shown in the diagram of Figure 1, is an automatic frequency control link, comprising discriminator 5, for maintaining the desired local oscillator frequency, and a second automatic frequency control link, comprising mixer 6 and discriminator 7, for maintaining the frequency of transmitter master oscillator 8 with reference to the frequency of local oscillator 2. These automatic controls may be of conventional form or, if desired, may be omitted. Modulator 4, however, may be in accordance with the invention as hereinafter set forth.

Figure 2:
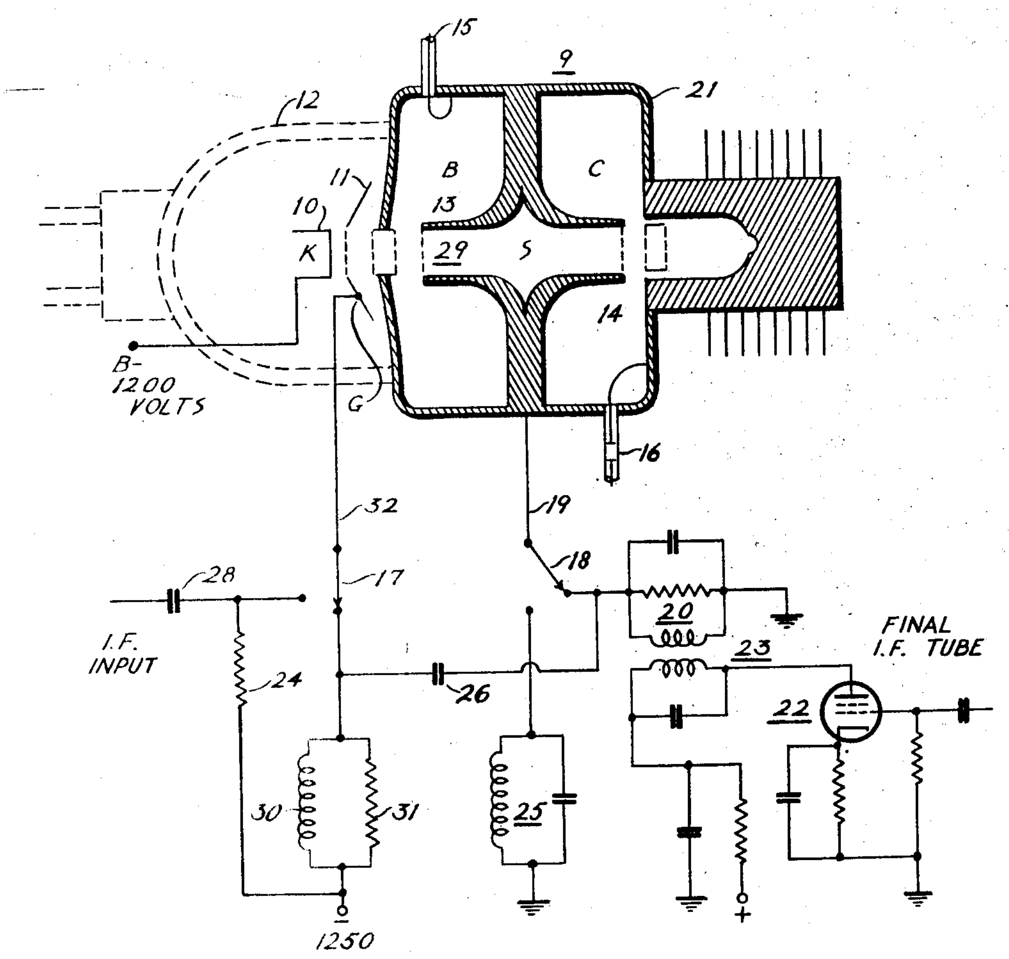
Figure 2 is a schematic diagram by reference to which two embodiments of the invention will be explained.

In one embodiment of the invention, according to Figure 2, the velocity modulation tube 9, which is preferably of high transductance, may comprise an electron-emitting cathode 10, a beam-controlling grid 11 and a cavity resonator structure 21. The latter may contain two annular resonant cavities 13 and 14, each provided with a pair of centrally disposed and spaced grids for coupling to an electron stream, and these cavities may be separated by an electron drift space 29. In general, as applied to velocity modulation tubes, and as used in this specification, the term drift space connotes a substantially equipotential region, or one in passing through which, charged particles will not normally be subjected to forces tending to alter their velocities. Cathode 10 and grid 11 may be enclosed in envelope 12 of glass or other suitable material sealed to cavity resonator 21. Electrons emitted by cathode 10 may be accelerated by maintaining a potential difference between cavity resonator 21 and cathode 10 in the manner shown, wherein the latter is connected to a negative potential source of, for example, —1200 volts, while the resonator is connected to ground through tuned circuit 20. This acceleration will serve to impart to them a certain average velocity upon their arrival in the region of cavity 13 and prior to their entry into equipotential drift space 29. Grid 11 may likewise be maintained at a suitable potential to regulate the intensity of the electron beam. Wave signals from a suitable source, such as transmitter master oscillator 8 of Figure 1, are supplied to cavity 13 through an inductive coupling loop 15. They may be of a frequency in the super-high frequency range (e. g. 3300 megacycles) which, when combined with the intermediate frequency from I.-F. amplifier 3 of Figure 1 (e. g. 60 megacycles), will yield a sum or difference frequency corresponding to the desired carrier for retransmission. Their amplitude should be such as to alter the velocities of electrons passing cavity 13 by amounts sufficient to cause bunching of electrons as they pass cavity 14 after passing through equipotential drift space 29. Thus, if the signal supplied to cavity 13 is represented at A in Figure 3, there will be produced, in the region of cavity 14, condensations and rarefactions in electron density at the same frequency but out of phase.

The velocities of electrons entering drift space 29 may be further varied at a frequency lower than that applied to resonant cavity 13 by applying a suitable signal between cavity resonator 21 and cathode 10. This signal may be a frequency-modulated intermediate frequency signal from amplifier 3 of Figure 1 at a frequency of, for example, 60 megacycles. Its application between the cavity resonator structure and the cathode of the tube will also tend to cause variations in the intensity of the beam of electrons entering the drift space, but this does not appear to affect the operation of the system in accordance with the invention. As shown in Figure 2, this signal may be supplied from the final stage 22 of the intermediate frequency amplifier through transformer 23 to tuned circuit 20, the latter being tuned to the intermediate frequency. The effect of such low frequency variation in the velocities of electrons entering drift space 29, will be to cause secondary bunching of the electrons as they pass the region of resonant cavity 14. Referring now to Figure 3, if the wave form shown at C represents the intermediate frequency signal, the effect just referred to will be to vary the spacing of the original bunches represented at B in the manner shown at D. The intervals F, during which the bunches are relatively closely spaced, will correspond to power output at frequencies in the neighborhood of the sum of the master oscillator (3300 mc.) and intermediate frequency (60 mc.) signals applied to the tube to vary the velocities of electrons entering the drift space. Intervals G during which bunches are relatively widely spaced will correspond to power output at frequencies in the neighborhood of the difference of these two frequencies. Similarly, intervals H, during which the spacing of bunches approximates that of the original bunches represented at B, will correspond to power output at the frequency of the master oscillator.

By tuning cavity 14 to either the sum or the difference frequency, power at this frequency may be extracted from the electron beam as it passes the region of the cavity. Such power will be modulated in accordance with the rate of passage of electrons past the region of the cavity (i. e. the number of electrons passing the region per unit time). It may be removed through coupling loop 16 for supply to a suitable transmitting antenna or other signal utilization means, care being taken to insure that such coupling will not short-circuit the intermediate frequency modulating signal applied to the cavity resonator structure.

I have discovered as shown in D of Figure 3, that power at the desired sum or difference frequency is obtainable during only a portion of each cycle of the low frequency signal applied between the cathode and the cavity resonator of the velocity modulation tube. Power present during the rest of each such cycle will, therefore, be wasted by dissipation in the tube unless other arrangements are made. I have determined that by substantially reducing, or preferably by cutting off completely, the flow of electrons from the cathode of the tube during these portions of the cycle, this waste can be avoided and the efficiency of the system correspondingly improved. Cut-off in this manner can be obtained in a number of ways, of which only the most convenient will here be shown and described. Referring again to Figure 2, grid 11 may be so biased with respect to cathode 10 as to maintain the beam of electrons normally cut off. Thus the grid may be maintained at a potential of —1250 volts, while the cathode is maintained at —1200 volts. By further applying to grid 11 a signal at the intermediate frequency but out of phase with respect to the signal applied to cavity resonator 21, electrons may be caused to flow from cathode 10 toward the drift space only during the desired portion of the intermediate frequency cycle. Thus, as shown at E in Figure 3, a signal at this frequency, shifted by 90° with respect to the signal shown at C, can be used to cause electrons to flow only during the internal F in which the phase-shifted signal exceeds the amplitude level 27 corresponding to cut-off of the electron beam by the biasing potential applied between grid and cathode. Actually, although it is not apparent from Figure 3, somewhat more than 90° phase shift will be required to take account of the transit time of electrons from grid 11 to cavity resonator 9. This will cause power to be generated at frequencies in the neighborhood of the sum of the master oscillator and intermediate frequencies only. It is obvious from Figure 3 that a similar selection could be performed with respect to power at the difference frequency. As shown in Figure 2, the phase-shifted intermediate frequency signal can conveniently be derived from a phase shifting network comprising condenser 26, inductor 30 and resistor 31 connected across tuned circuit 20 and may be applied, through connection 32 to control grid 11, to effect the desired selection with respect to time.

An alternative arrangement for securing the same selection with respect to time of output power at the desired frequency is obtained in the showing of Figure 2 by placing switches 17 and 18 in the positions alternative to those shown. In this arrangement, intermediate frequency signal from amplifier 3 of Figure 1 is supplied through condenser 28 and conection 32 to grid 11 of the velocity modulation tube 9, which grid is also connected to the 1250 volt negative supply through a suitable resistor 24. The amplitude of the intermediate frequency signal may be made such that electrons will flow from cathode 10 to the drift space during only a portion of each intermediate frequency cycle. The intermediate frequency components of the electron beam are also caused to excite tuned circuit 25, which may be detuned from the intermediate frequency in the appropriate sense to cause power at either the sum or the difference frequency predominantly to be generated. In the case where the detuning is such as to cause the tuned circuit to be inductive at the intermediate frequency, the sum frequency will be produced, while in the case where the detuning is such as to cause the tuned circuit to be capacitive at the intermediate frequency, the difference frequency will be present. In this arrangement, the velocity modulation tube is used simultaneously as a modulated power amplifier and as a modulation frequency amplifier, thereby performing a dual function.

It will be apparent that, by appropriate adjustment of the phase-shifting network comprising elements 26, 30 and 31, and of resonant circuit 25, in the circuits shown in Figure 2, the velocity modulation tube may be made to yield modulated power at either the sum or the difference frequency, depending upon the positions of switches 17 and 18.

Although my invention has been described with reference to a single embodiment so far as the velocity modulation tube itself is concerned, it should be understood that the invention is not intended to be limited to the specific type of tube and connections shown. Numerous variations in accordance with the invention will occur to those skilled in the art. Thus, the drift space need not be straight as shown in the embodiment, but, if desired, and if such proves convenient, may be curved, the charged particles or electrons being caused to follow the curved path by the application of suitable electromagnetic fields. Likewise, alternative means may be used for achieving velocity modulation of the electron beam. In the embodiment, electrodynamic grids are shown, the intermediate frequency being applied directly between the cathode and the cavity resonator structure, and the super-high frequency, master oscillator signal being applied through a resonant cavity because of the greater efficiency of this mode of application at such a high frequency. The arrangement of these grids and the method of applying signal to them might be varied considerably as will occur to those skilled in the art, and magnetic means for controlling the velocity of electrons passing into the drift space might be substituted for either or both of the electrodynamic grids. The cutting off of the electron beam during the portion of each intermediate frequency cycle during which power at the desired frequency is not present, might be achieved by deflecting the electron beam or by interrupting it mechanically, as well as in the manner shown. Finally, power output might be derived through the use of other forms of inductive or capacitive outputs, by fluorescence, by thermal or mechanical effects, or by deposit of charged particles on a fixed or a moving body such as an iconoscope screen.

I claim:

1. In a signal mixing system, an evacuated drift space for electrons, means creating a flow of electrons through said drift space, means altering at a relatively low frequency the velocities of electrons passing a region in said drift space, means altering at a relatively high frequency the velocities of electrons passing a region in said drift space, means for stopping the flow of electrons in said drift space during intervals of predetermined duration at said low frequency, and means responsive to variations in the rate of passage of electrons through a region in said drift space some finite distance from said first two regions in the direction of drift of said electrons.

2. In a signal mixing system an evacuated drift space for electrically charged particles, means creating a flow of charged particles through said drift space, means altering at a relatively low frequency the velocities of particles passing a region in said drift space, means altering at a relatively high frequency the velocities of particles passing a region in said drift space, means for substantially reducing the flow of charged particles in said drift space during intervals of predetermined duration at said low frequency, and means responsive to variations in the rate of passage of charged particles through a region in said drift space some finite distance from said first two regions in the direction of drift of said particles.

3. In a signal mixing system, an evacuated drift space for electrically charged particles, means creating a flow of charged particles through said drift space, means responsive to a relatively low frequency signal for altering as a function of the instantaneous amplitude of said signal the velocities of particles passing a region in said drift space, means altering at a relatively high frequency the velocities of particles passing a region in said drift space, means shifting the phase of said low frequency signal, means responsive to portions of said phase shifted signal of certain polarity with reference to a predetermined amplitude level for substantially reducing the flow of charged particles in said drift space, and means responsive to variations in the rate of passage of charged particles through a region in said drift space some finite distance from said first two regions in the direction of drift of said particles.

4. In a signal mixing system, an evacuated drift space for electrically charged particles, means creating a flow of charged particles through said drift space during time-spaced intervals recurrent at a relatively low frequency, means altering at a relatively high frequency the velocities of particles passing a region in said drift space, a resonant circuit somewhat detuned from said low frequency and means for exciting said circuit in response to the low frequency components in said flow, means altering the velocities of particles passing a region in said drift space in response to the signal developed across said resonant circuit, and means responsive to variations in the rate of passage of charged particles through a region in said drift space some finite distance from said first two regions in the direction of drift of said particles.

5. In a signal mixing system, an evacuated drift space for electrically charged particles, means creating a flow of charged particles through said drift space, means altering at a relatively low frequency the velocities of particles entering said drift space, means altering at a relatively high frequency the velocities of particles entering said drift space, means for stopping the flow of charged particles in said drift space during intervals of predetermined duration at said low frequency, and means responsive to variations in the rate of passage of charged particles through a region in said drift space some finite distance from the point of entry of said particles.

6. In a signal mixing system, a velocity modulation space discharge device comprising an electron emitting cathode, a control grid, a cavity structure consisting of a pair of cavity resonators each coupled to a separate pair of spaced grids and an electron drift space disposed between said pairs of grids, means applying a relatively low frequency signal to said control grid to cause electrons to flow from said cathode into said drift space during time-spaced intervals at said frequency, means for shifting the phase of said low frequency signal and for applying it to vary the potential of said cavity structure with reference to said cathode and thereby the velocities of electrons entering said drift space, means applying a relatively high frequency signal to said cavity resonator which is closer to said cathode, further to alter the velocities of electrons entering said drift space, and means for extracting from said other cavity resonator a signal which varies in accordance with the rate of passage of electrons between the grids coupled thereto.

7. In a signal mixing system, an evacuated drift space for electrically charged particles, means creating a flow of charged particles through said drift space, means creating bunching of said particles at a relatively low frequency in a region of said drift space, means creating further bunching of said particles at a relatively high frequency in said same region, means for substantially reducing the flow of particles in said drift space during time-spaced intervals of predetermined duration at said low frequency, and means responsive to variations in the degree of bunching of particles in said region.

WILLIAM E. BRADLEY.

REFERENCES CITED

The following references are of record in the file of this patent:

UNITED STATES PATENTS

| Number | Name | Date |
|---|---|---|
| 2,312,919 | Litton | Mar. 2, 1943 |
| 2,350,907 | Kroger | June 6, 1944 |
| 2,379,819 | Mason | July 3, 1945 |
| 2,409,608 | Anderson | Oct. 22, 1946 |